(12) United States Patent
Yoon et al.

(10) Patent No.: US 11,569,938 B2
(45) Date of Patent: Jan. 31, 2023

(54) METHOD AND APPARATUS FOR TRANSMITTING AND RECEIVING SIGNAL USING MULTIPLE ANTENNAS

(71) Applicant: ELECTRONICS AND TELECOMMUNICATIONS RESEARCH INSTITUTE, Daejeon (KR)

(72) Inventors: Chan Ho Yoon, Daejeon (KR); Young Jo Ko, Daejeon (KR); Kap Seok Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 140 days.

(21) Appl. No.: 17/109,503

(22) Filed: Dec. 2, 2020

(65) Prior Publication Data

US 2021/0226730 A1 Jul. 22, 2021

(30) Foreign Application Priority Data

Jan. 21, 2020 (KR) .................. 10-2020-0007812
Nov. 26, 2020 (KR) .................. 10-2020-0161466

(51) Int. Cl.
*H04L 1/00* (2006.01)
*H04L 1/06* (2006.01)

(52) U.S. Cl.
CPC .......... *H04L 1/0071* (2013.01); *H04L 1/0003* (2013.01); *H04L 1/0606* (2013.01)

(58) Field of Classification Search
CPC .... H04L 1/0071; H04L 1/0003; H04L 1/0606
See application file for complete search history.

(56) References Cited

U.S. PATENT DOCUMENTS

| | | | |
|---|---|---|---|
| 2006/0045169 A1 | 3/2006 | Kim | |
| 2010/0296603 A1* | 11/2010 | Lee ................. | H04L 1/0071 375/295 |

(Continued)

FOREIGN PATENT DOCUMENTS

| | | |
|---|---|---|
| WO | 2009134082 A2 | 11/2009 |
| WO | 2010002192 A2 | 1/2010 |

(Continued)

OTHER PUBLICATIONS

Andrea M. Tonello, "Space-Time Bit-Interleaved Coded Modulation with an Iterative Decoding Strategy", Vehicular Technology Conference Fall 2000. IEEE VTS Fall VTC2000. 52nd Vehicular Technology Conference.

*Primary Examiner* — Elton Williams
(74) *Attorney, Agent, or Firm* — LRK Patent Law Firm

(57) ABSTRACT

An operation method of a first communication node includes generating a plurality of modulation symbols for information bits; determining a symbol mapping pattern based on a number $N_t$ of antennas of the first communication node, a number $N_L$ of spatial layers multiplexed in a same frequency resource, and a number $N_{SSF}$ of modulation symbols belonging to one space-frequency grid; mapping the plurality of modulation symbols to a space-frequency domain based on the symbol mapping pattern; and transmitting the plurality of modulation symbols mapped to the space-frequency domain to a second communication node using the antennas.

12 Claims, 10 Drawing Sheets

(56) References Cited

U.S. PATENT DOCUMENTS

| | | | |
|---|---|---|---|
| 2017/0230138 A1 | 8/2017 | Xiong et al. | |
| 2018/0042028 A1* | 2/2018 | Nam | H04B 7/0626 |
| 2018/0205431 A1* | 7/2018 | Nammi | H04B 7/0478 |
| 2019/0149201 A1* | 5/2019 | Meilhac | H04B 7/0452 |
| | | | 375/267 |

FOREIGN PATENT DOCUMENTS

| | | |
|---|---|---|
| WO | 2010093815 A2 | 8/2010 |
| WO | 2011142601 A9 | 11/2011 |
| WO | 2014130893 A2 | 8/2014 |

\* cited by examiner

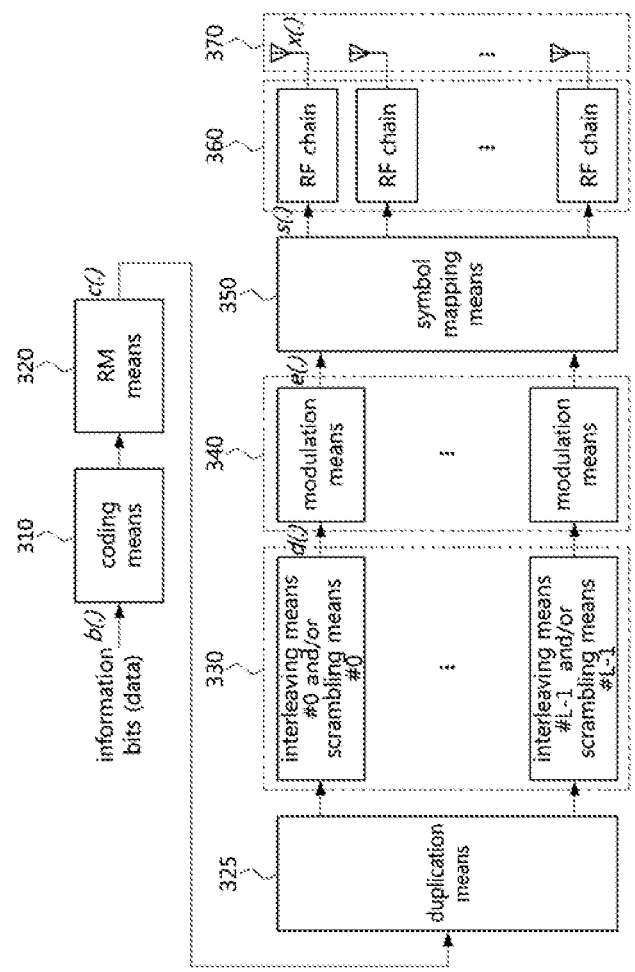

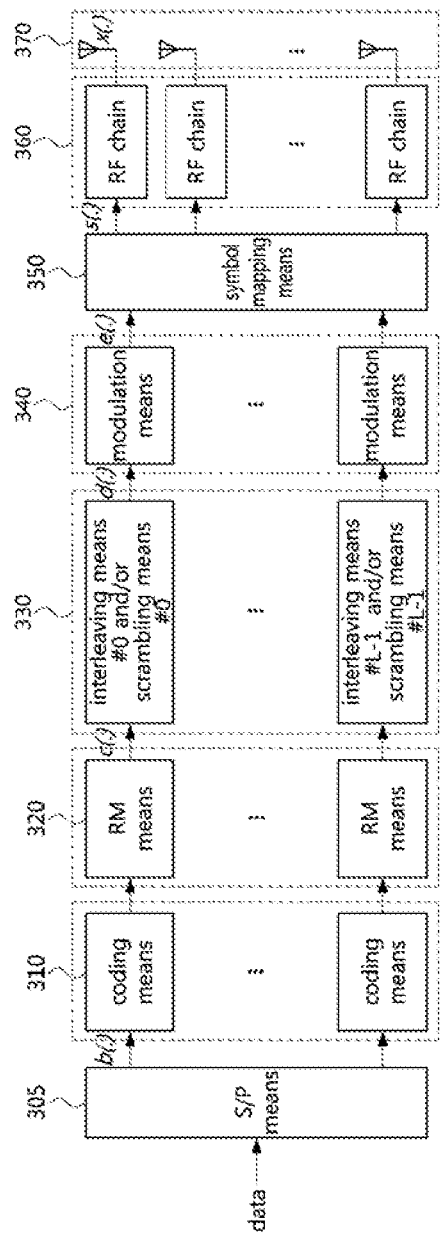

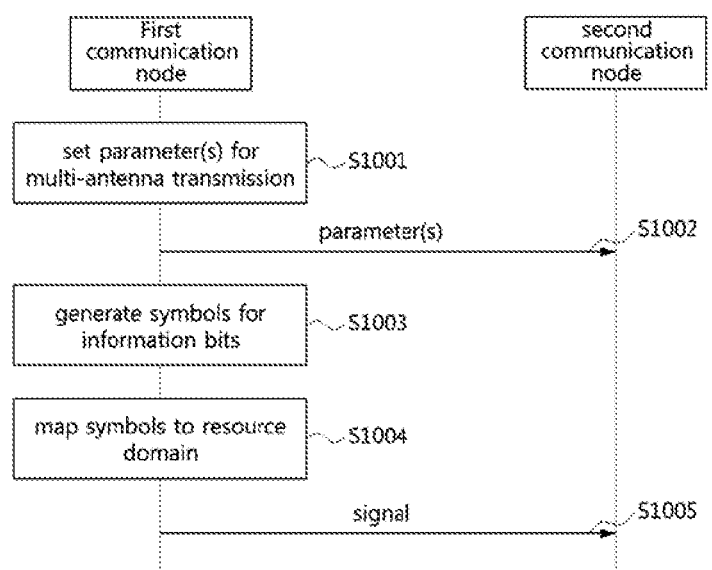

METHOD AND APPARATUS FOR TRANSMITTING AND RECEIVING SIGNAL USING MULTIPLE ANTENNAS

CROSS-REFERENCE TO RELATED APPLICATIONS

This application claims priority to Korean Patent Applications No. 10-2020-0007812 filed on Jan. 21, 2020 and No. 10-2020-0161466 filed on Nov. 26, 2020 with the Korean Intellectual Property Office (KIPO), the entire contents of which are hereby incorporated by reference.

BACKGROUND

1. Technical Field

The present disclosure relates to a technique for transmitting and receiving signals in a communication system, and more specifically, to a technique for transmitting and receiving signals using a sparse space frequency-bit interleaved coded modulation (SSF-BICM) scheme.

2. Description of Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The 5G communication system can support enhanced mobile broadband (eMBB), ultra-reliable low-latency communication (URLLC), massive machine type communication (mMTC), and the like.

A target reliability for URLLC may be a block error rate (BLER) of $10^{-5}$ or less, and a target latency for URLLC may be a user plane latency of 1 millisecond (ms) or less. The URLLC may be applied to a communication system for factory automation (hereinafter, referred to as a 'factory automation communication system'), a vehicle communication system (e.g., 'vehicle-to-everything (V2X) communication system'). In the factory automation communication system, a target reliability may be a BLER of $10^{-9}$ or less, and a target latency may be an end-to-end (E2E) communication latency of 1 ms or less.

In order to satisfy the URLLC requirements, communications between a base station and a terminal may be performed using a radio channel having high quality. For example, a communication technique using many radio resources and a communication technique for ensuring a high reception power may be used. In order to provide a channel quality to satisfy requirements (e.g., URLLC requirements) of all terminals located in a region of interest, a multi-antenna system may be used. In the multi-antenna system, a transmitter may transmit signals using a plurality of antennas, and a receiver may receive the signals using a plurality of antennas. In this case, the channel quality may be improved. If a coding scheme (e.g., time-space coding scheme) is used in the multi-antenna system, reliability of a radio channel may be improved. The space-time coding scheme may be classified into a space-time trellis coding (STTC) scheme and a space-time block coding (STBC) scheme.

In addition, a distributed antenna system (DAS) may be used. In the distributed antenna system, a plurality of antennas connected to one base station may be disposed in different geographic areas. The plurality of antennas may be properly disposed so that a region in which radio quality (e.g., channel quality) is deteriorated does not occur. When the distributed antenna system is applied to the factory automation communication system, a signal having a sufficient strength may be provided regardless of locations of terminals. When the distributed antenna system is used, the number of antennas used for transmission to one terminal may be two or more. In multi-point transmission using the distributed antenna system, signals may be transmitted to a terminal using one or more antennas located around the corresponding terminal.

When a plurality of antennas are used in the communication system using the STTC scheme or the STBC scheme, a transmitter may transmit signals using space-time domain resources or space-frequency domain resources. In this case, a sum of signals for antenna components may be received at a receiver in all time domain resources or all frequency domain resources. Here, the overlapped signals may increase in proportion to the number of antennas of the transmitter.

In the communication system using the STBC scheme, as the number $N_t$ of transmission antennas increases, the overlapped signals may increase. Here, the number $N_r$ of reception antennas may be smaller than the number $N_t$ of transmission antennas. As the number of overlapped signals to be processed by the receiver increases, complexity of the receiver may increase exponentially, and a demodulation performance of the receiver may decrease. The transmitter may use many antennas, but the number of antennas usable in the receiver may be limited. In this case, reception complexity for an operation of separating the overlapped signals and a demodulation operation of the separated signals may be high, and the performance of the receiver may decrease as the number of reception antennas decreases.

When the transmitter uses a plurality of antennas (e.g., when a massive antenna scheme is used), reliability of the radio channel may be improved, and a transmission space diversity gain may be improved. That is, the quality of the radio channel may be improved. However, in this case, the performance of the receiver may be degraded. In particular, in the communication system using the space-time coding scheme, when the number $N_r$ of reception antennas is smaller than the number $N_t$ of transmission antennas, the performance of the receiver may be degraded in the URLLC scenario.

SUMMARY

Accordingly, exemplary embodiments of the present disclosure are directed to providing methods and apparatuses for transmitting and receiving signals by using multiple antennas in a communication system.

According to a first exemplary embodiment of the present disclosure, an operation method of a first communication node in a communication system may comprise: generating a plurality of modulation symbols for information bits; determining a symbol mapping pattern based on a number $N_t$ of antennas of the first communication node, a number $N_L$ of spatial layers multiplexed in a same frequency resource, and a number $N_{SSF}$ of modulation symbols belonging to one space-frequency grid; mapping the plurality of modulation symbols to a space-frequency domain based on the symbol mapping pattern; and transmitting the plurality of modulation symbols mapped to the space-frequency domain to a second communication node using the antennas.

The plurality of modulation symbols may be symbols in a vector form, which are converted by serial-to-parallel conversion.

The generating of the plurality of modulation symbols may comprise: generating one codeword for the information bits; generating a plurality of codewords by duplicating the one codeword; performing an interleaving operation or a scrambling operation for each of the plurality of codewords; and generating the plurality of modulation symbols by performing a modulation operation on each of the interleaved codewords or the scrambled codewords.

The generating of the plurality of modulation symbols may comprise: generating a plurality of information bit streams by performing serial-to-parallel conversion on the information bits; generating a plurality of codewords by performing a coding operation on each of the plurality of information bit streams; performing an interleaving operation or a scrambling operation for each of the plurality of codewords; and generating the plurality of modulation symbols by performing a modulation operation on each of the interleaved codewords or the scrambled codewords.

One or more space-frequency grids may exist in the space-frequency domain, a number of spatial resources in the one space-frequency grid may be $N_t$, a number of frequency resources in the one space-frequency grid may be $N_{SSF}/N_L$, and a symbol mapping pattern may be same in the $N_{SSF}/N_L$ frequency resources of the one space-frequency grid.

The mapping of the plurality of modulation symbols to the space-frequency domain may comprise: mapping a modulation symbol #i among the plurality of modulation symbols to a spatial resource #m in a frequency resource #k; and mapping a modulation symbol #i+1 among the plurality of modulation symbols to a spatial resource #m+$N_t/N_L$ of the frequency resource #k, wherein each of i, k, and m is an integer equal to or greater than 0.

The mapping of the plurality of modulation symbols to the space-frequency domain may comprise: mapping $N_L$ modulation symbols among the plurality of modulation symbols to a spatial domain of a frequency resource #k; and when the $N_L$ modulation symbols are mapped to the spatial domain of the frequency resource #k, performing a symbol mapping operation in a spatial domain of a frequency resource #k+1, wherein k is an integer equal to or greater than 0.

The operation method may further comprise transmitting, to the second communication node, a message including one or more of $N_t$, $N_L$, and $N_{SSF}$.

According to a second exemplary embodiment of the present disclosure, an operation method of a second communication node in a communication system may comprise: receiving, from a first communication node, a message including information on a number $N_t$ of antennas of the first communication node, a number $N_L$ of spatial layers multiplexed in a same frequency resource, and a number $N_{SSF}$ of modulation symbols belonging to one space-frequency grid; receiving a signal including data from the first communication node; obtaining a plurality of symbols from the signal based on a symbol mapping pattern determined based on $N_t$, $N_L$, and $N_{SSF}$; and obtaining the data by performing demodulation and decoding operations on the plurality of symbols.

The obtaining of the plurality of symbols may comprise: obtaining a symbol #i among the plurality of symbols from a spatial resource #m of a frequency resource #k; and obtaining a symbol #i+1 among the plurality of symbols from a spatial resource #m+$N_t/N_L$ of the frequency resource #k, wherein each of i, k, and m is an integer equal to or greater than 0.

The obtaining of the plurality of symbols may comprise: obtaining $N_L$ symbols among the plurality of symbols from a spatial domain of a frequency resource #k; and when the $N_L$ symbols are obtained in the spatial domain of the frequency resource #k, performing a symbol acquisition operation in a spatial domain of a frequency resource #k+1, wherein k is an integer equal to or greater than 0.

According to a third exemplary embodiment of the present disclosure, a first communication node in a communication system may comprise a processor; a memory electronically communicating with the processor; and instructions stored in the memory, wherein when executed by the processor, the instructions causes the first communication node to: generate a plurality of modulation symbols for information bits; determine a symbol mapping pattern based on a number $N_t$ of antennas of the first communication node, a number $N_L$ of spatial layers multiplexed in a same frequency resource, and a number $N_{SSF}$ of modulation symbols belonging to one space-frequency grid; map the plurality of modulation symbols to a space-frequency domain based on the symbol mapping pattern; and transmit the plurality of modulation symbols mapped to the space-frequency domain to a second communication node using the antennas.

The plurality of modulation symbols may be symbols in a vector form, which are converted by serial-to-parallel conversion.

When generating the plurality of modulation symbols, the instructions may cause the first communication node to: generate one codeword for the information bits; generate a plurality of codewords by duplicating the one codeword; perform an interleaving operation or a scrambling operation for each of the plurality of codewords; and generate the plurality of modulation symbols by performing a modulation operation on each of the interleaved codewords or the scrambled codewords.

When generating the plurality of modulation symbols, the instructions may cause the first communication node to: generate a plurality of information bit streams by performing serial-to-parallel conversion on the information bits; generate a plurality of codewords by performing a coding operation on each of the plurality of information bit streams; perform an interleaving operation or a scrambling operation for each of the plurality of codewords; and generate the plurality of modulation symbols by performing a modulation operation on each of the interleaved codewords or the scrambled codewords.

One or more space-frequency grids may exist in the space-frequency domain, a number of spatial resources in the one space-frequency grid may be $N_t$, a number of frequency resources in the one space-frequency grid may be $N_{SSF}/N_L$, and a symbol mapping pattern may be same in the $N_{SSF}/N_L$ frequency resources of the one space-frequency grid.

When mapping the plurality of modulation symbols to the space-frequency domain, the instructions may cause the first communication node to: map a modulation symbol #i among the plurality of modulation symbols to a spatial resource #m in a frequency resource #k; and map a modulation symbol #i+1 among the plurality of modulation symbols to a spatial resource #m+$N_t/N_L$ of the frequency resource #k, wherein each of i, k, and m is an integer equal to or greater than 0.

When mapping the plurality of modulation symbols to the space-frequency domain, the instructions may cause the first communication node to: map $N_L$ modulation symbols among the plurality of modulation symbols to a spatial domain of a frequency resource #k; and when the $N_L$ modulation symbols are mapped to the spatial domain of the frequency resource #k, perform a symbol mapping operation in a spatial domain of a frequency resource #k+1, wherein k is an integer equal to or greater than 0.

According to the exemplary embodiments of the present disclosure, a transmitter may transmit signals using a plurality of antennas, and thus a spatial diversity gain may be obtained. The transmitter may adjust a transmission quality and/or reception complexity by adjusting parameters used to determine a symbol mapping pattern. The transmitter may adjust the above-described parameters without receiving channel estimation information from a receiver. In this case, low-latency requirements may be satisfied. Further, a frequency diversity gain may be obtained by applying a precoding convolution vector for each transmission antenna, and a transmission reliability may be improved accordingly. That is, the URLLC requirements may be satisfied, and the performance of the communication system may be improved.

BRIEF DESCRIPTION OF DRAWINGS

Exemplary embodiments of the present disclosure will become more apparent by describing in detail embodiments of the present disclosure with reference to the accompanying drawings, in which:

FIG. 8 is a block diagram illustrating a third exemplary embodiment of a transmitter in a communication system;

FIG. 9 is a block diagram illustrating a fourth exemplary embodiment of a transmitter in a communication system; and FIG. 10 is a sequence chart illustrating a first exemplary embodiment of a communication method using multiple antennas in a communication system.

Figure 1:
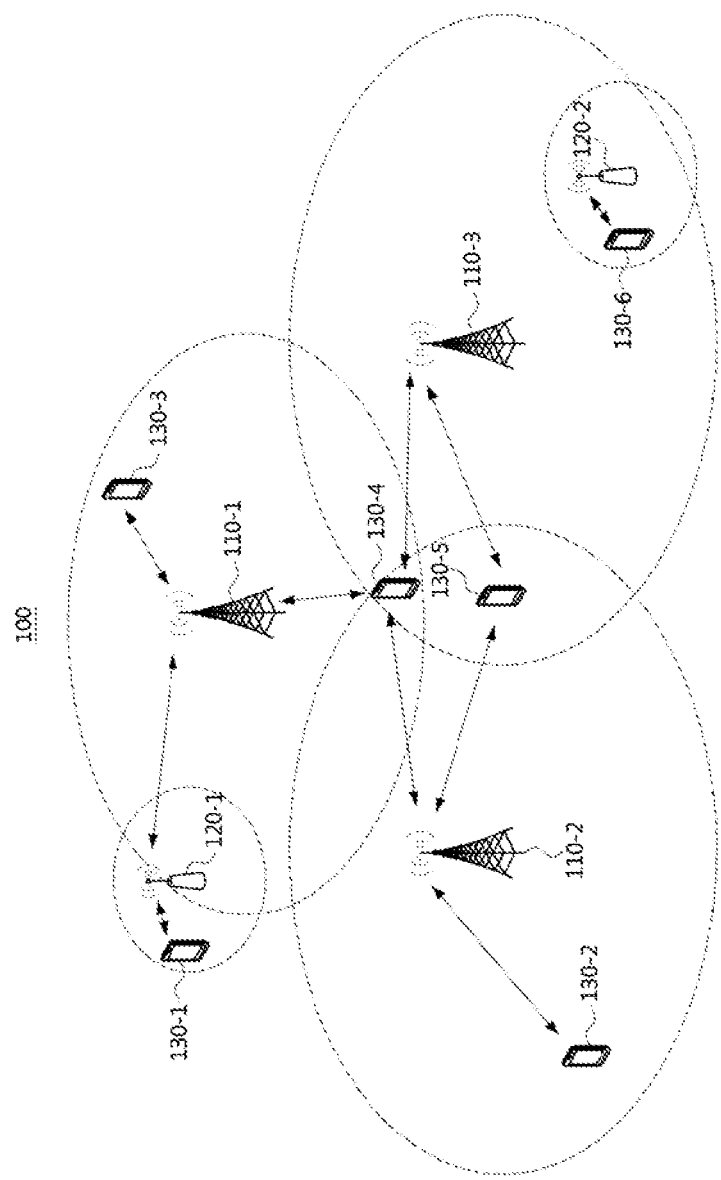
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be a 4G communication network (e.g., a long-term evolution (LTE) communication system or an LTE-advanced (LTE-A) communication system), a 5G communication network (e.g., a new radio (NR) communication system), or the like. The 4G communication system may support communication in a frequency band of 6 GHz or below. The 5G communication system may support communication in a frequency band of 6 GHz or above, as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network. The 'LTE' may refer to the 4G communication system, LTE communication system, or LTE-A communication system, and the 'NR' may refer to the 5G communication system or NR communication system.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
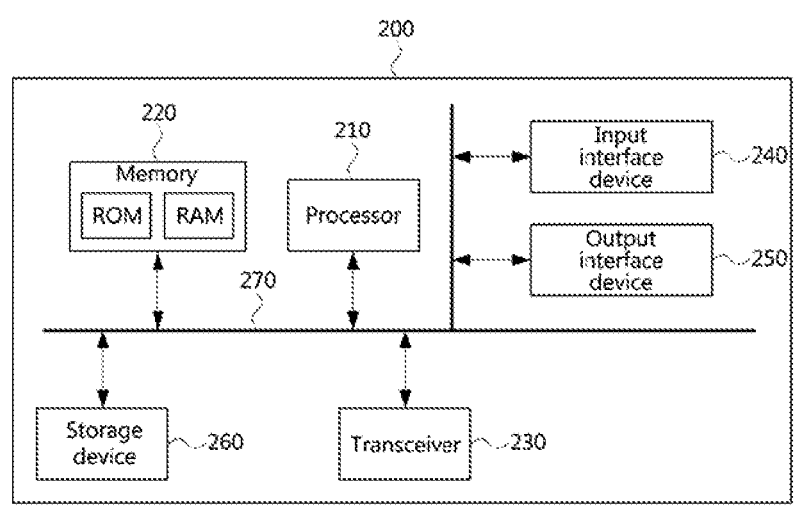
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. In addition, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), a macro cell, a pico cell, a micro cell, a femto cell, or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for transmitting and receiving signals by using a plurality of antennas in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

In a communication system, a time-space coding scheme may be used. The space-time coding scheme may be classified into a space-time trellis coding (STTC) scheme and a space-time block coding (STBC) scheme. The following exemplary embodiments may be implemented based on the STTC scheme or the STBC scheme. In addition, the following exemplary embodiments may be implemented based on a space-frequency trellis coding (SFTC) scheme or a space-frequency block coding (SFBC) scheme. In the following exemplary embodiments, a signal processing method may be different from a signal processing method in a communication node supporting the conventional STBC scheme.

The exemplary embodiments below may be implemented based on the method(s) below.

Method 1: A codeword may be transmitted through a plurality of transmission antennas (e.g., a plurality of radio frequency (RF) chains), and a receiver may use a plurality of reception antennas to receive the codeword. The number $N_t$ of the transmission antennas may be greater than the number $N_r$ of the reception antennas. The transmission diversity gain may be improved by Method 1 described above.

Method 2: A codeword may be mapped to a plurality of transmission antennas (e.g., a plurality of RF chains) in a sparse form. In this case, the codeword may be transmitted through a single spatial layer or multiple spatial layers. The transmission diversity gain may be improved by Method 2 described above.

Method 3: A codeword may be transmitted using more transmission antennas than the number of spatial layers. In this case, the complexity at the receiver may be suppressed by the number of spatial layers.

Method 4: Bit-level interleaving or symbol-level interleaving may be applied to a codeword according to a transmission bandwidth. The bit-level scrambling or symbol-level scrambling may be applied to the codeword in accordance with a transmission bandwidth.

Method 5: The above-described methods (e.g., Methods 1 to 4) may be applied to a plurality of codewords.

Method 6: A precoding vector may be applied to a codeword according to a transmission bandwidth. Here, the codeword may be a symbol-level codeword generated in the frequency domain or the time domain.

Meanwhile, a communication system (e.g., factory automation communication system) may support enhanced Mobile BroadBand (eMBB), Ultra-Reliable and Low-Latency Communication (URLLC), and/or massive Machine Type Communication (mMTC). In particular, for control operations and/or alarm operations of machines in the factory automation communication system, a target reliability (e.g., URLLC requirements) may be a block error rate (BLER) of $10^{-9}$ or less, and a target latency may be a communication latency of 0.3 to 0.1 millisecond (ms). In order to satisfy the URLLC requirements in a radio fading channel, encoded information bits (e.g., codeword) may be transmitted using a plurality of antennas. In this case, a frequency diversity gain may be improved.

In order to improve a transmission performance (e.g., increase the transmission diversity gain) and minimize a reception complexity, a sparse space frequency-bit interleaved coded modulation (SSF-BICM) scheme (e.g., generalized SSF-BICM scheme) may be used. In this case, one codeword may be transmitted in a distributed form using all the transmission antennas. Even when many transmission antennas are used, the codeword may be distributed.

As the reception complexity decreases, a decoding latency also decreases, so that URLLC requirements may be satisfied. In order to cope with deep fading only by beamforming in the communication system, a closed-loop feedback scheme may be used. When the closed-loop feedback scheme is used, high reliability may be guaranteed, but a transmission latency may occur. Accordingly, in the communication system supporting the SSF-BICM scheme, an open-loop scheme without feedback may be used.

1) Single Codeword Based Transmission Method

In order to satisfy the URLLC requirements, the SSF-BICM scheme may be used. When the SSF-BICM scheme is used, the spatial diversity gain and/or the frequency diversity gain may be maximized. In transmitters, shown in FIGS. 3, 7, 8, and 9 to be described later, information bits (e.g., data) may be modulated into an OFDM waveform in the baseband, and may be wirelessly transmitted through RF chain(s) and antenna(s). In exemplary embodiments, each of the transmitter and the receiver may be a base station or a terminal. For example, when the transmitter is a base station, the receiver may be a terminal. When the transmitter is a terminal, the receiver may be a base station or another terminal.

Figure 3:
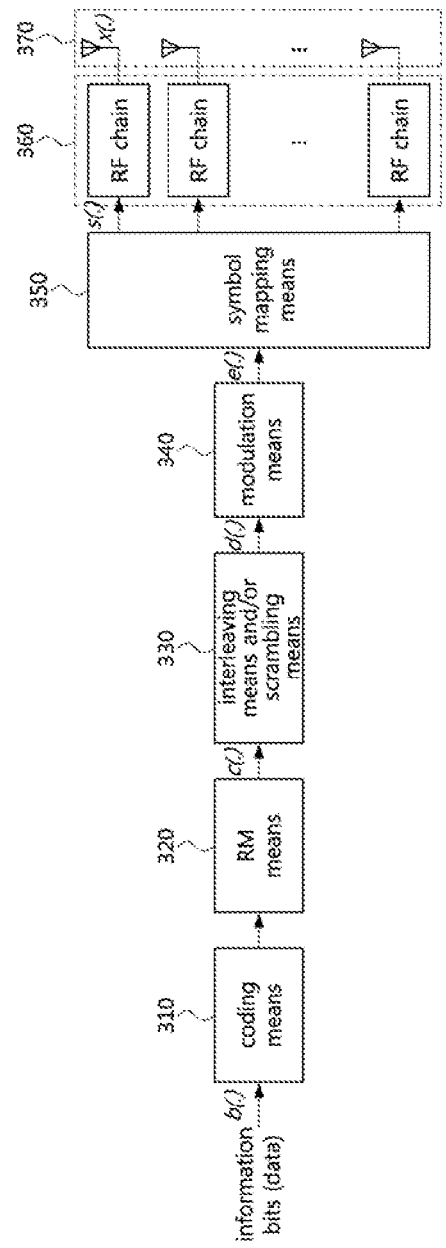
FIG. 3 is a block diagram illustrating a first exemplary embodiment of a transmitter in a communication system.

FIG. 3 is a block diagram illustrating a first exemplary embodiment of a transmitter in a communication system.

Referring to FIG. 3, a transmitter may comprise a coding means 310, a rate matching (RM) means 320, an interleaving means 330 (or scrambling means 330), a modulation means 340, a symbol mapping means 350, an RF chain 360, and an antenna 370. Here, the RM means 320, interleaving means 330, and/or scrambling means 330 may be optional means. Operations of the coding means 310, RM means 320, interleaving means 330 (or scrambling means 330), modulation means 340, symbol mapping means 350, RF chain 360, and antenna 370 may be controlled by the processor 210 shown in FIG. 2.

Information bits (e.g., data) may be input to the coding means 310. The information bit may be referred to as b(•). The information bits may mean an 'information bit stream'. The coding means 310 may be a channel encoder that performs a forward error correction (FEC) function. The coding means 310 may output a codeword by performing a coding operation on the information bits. Here, a cyclic redundancy check (CRC) value may be appended to the information bits. The length of the CRC value may be variously set. For example, the length of the CRC value may be 6 bits, 11 bits, 16 bits, or 24 bits.

The output (e.g., codeword) of the coding means 310 may be input to the RM means 320. The RM means 320 may perform a rate matching operation on the codeword. For example, the RM means 320 may adjust the length of the codeword in order to map the codeword to physical resources. The RM means 320 may generate a rate-matched codeword by performing a puncturing operation or a shortening operation. The rate-matched codeword may be referred to as c(•). When the rate matching operation is omitted, the output of the coding means 310 may be referred to as c(•). In exemplary embodiments, the codeword (e.g., c(•)) may mean the output of the coding means 310 or the output of the RM means 320.

The codeword may be input to the interleaving means 330 and/or the scrambling means 330. That is, at least one of the interleaving operation and the scrambling operation may be performed. Alternatively, when the interleaving operation and the scrambling operation are not supported, the codeword may be input to the modulation means 340. The interleaving means 330 may perform a bit-level interleaving operation on the codeword. The interleaving operation may be performed based on two scheme. In the first interleaving scheme, an interleaving depth may be the total length of the codeword. In this case, the interleaving operation may be applied to the entire codeword. In the second interleaving scheme, the interleaving depth may be a partial length of the codeword. For example, one codeword may be divided into partial codewords having an arbitrary length, and the interleaving operation may be applied to each of the partial codewords. Here, a permutation pattern of a user-specific bit interleaver may be expressed as a 'user-specific short block permutation'.

Figure 4:
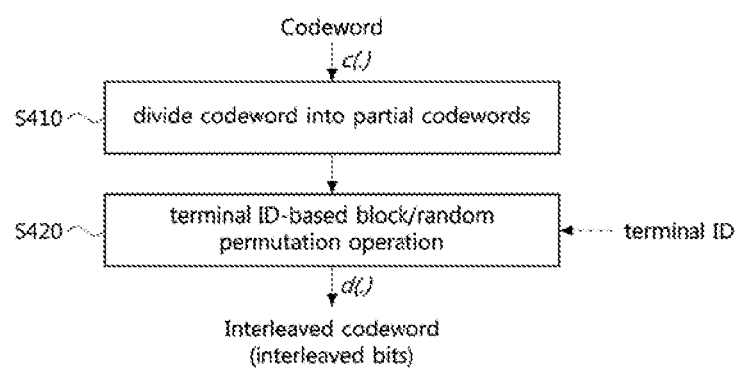
FIG. 4 is a flowchart illustrating a first exemplary embodiment of a bit-level interleaving method.

FIG. 4 is a flowchart illustrating a first exemplary embodiment of a bit-level interleaving method.

Referring to FIG. 4, the interleaving means 330 may divide the codeword c(•) into partial codewords (S410). The partial codewords may have the same length. The interleaving means 330 may generate an interleaved codeword d(•) by performing a block permutation operation or a random permutation operation using a terminal ID (e.g., terminal-specific identifier) (S420). The terminal ID may be assigned in advance by the base station (e.g., transmitter). When there are a plurality of interleavers (e.g., interleaving means) for each codeword, a signature permutation pattern may be generated by referring to a symbol number (e.g., OFDM symbol number).

The base station (e.g., transmitter) may perform a bit-level block permutation operation for a user-specific partial codeword using the terminal ID. The length of the partial codeword (e.g., user-specific partial codeword) may be $L_{itlv}$. The base station may perform the interleaving operation (e.g., bit-level block permutation operation) based on Equation 1 below.

$$d_0((a_0 + i)\%L_{itlv}) = c(i) \qquad \text{[Equation 1]}$$
$$d_1((L_{itlv}/2) \cdot (i\%2) + \lfloor i/2 \rfloor) = d_0(i)$$
$$d_2((3a_1 + k)\%L_{itlv}) = d_1(i)$$
$$d_3\left(2 \cdot \left\lfloor \frac{i}{2} \right\rfloor + (i + L_{itlv} - \lfloor 2i \rfloor)\%L_{itlv}\right) = d_2(i)$$
$$d_4((5a_2 + k)\%L_{itlv}) = d_3(i)$$
$$d_5(i) = d_4((L_{itlv}/4) \cdot (i\%4) + \lfloor i/4 \rfloor)$$
$$d_6(((7 + n_{OS})a_3 + k)\%L_{itlv})d_5(i)$$
$$d_7((L_{itlv}/Q) \cdot k + i) = d_6(v(i))$$
$$i = \lfloor n\%L_{itlv} \rfloor$$
$$n = 0, 1, 2, \ldots, Ci - 1$$
$$k = 0, 1, 2, \ldots, \frac{C}{Q} - 1$$

Here, % may mean a modulo operation. '$a_0, a_1, a_2, a_3$' may be determined using an ID (e.g., terminal ID). $n_{OS}$ may be a symbol number (e.g., OFDM symbol number). C may be the length of the rate-matched codeword. Q may be a modulation order. The modulation scheme may be a binary phase shift keying (BPSK) scheme, a quadrature phase shift keying (QPSK) scheme, a quadrature amplitude modulation (16-QAM) scheme, or the like.

Referring back to FIG. 3, the scrambling means 330 may perform a bit-level scrambling operation on the codeword c(•). The bit-level scrambling operation may be performed based on Equation 2 below.

$$w(i)=(w_1(i+\epsilon) \cdot w_2(i+\epsilon))\%2$$

$$w_1(i+31)=(w_1(i+3)+w_1(i))\%2$$

$$w_2(i+31)=(w_2(i+3)+w_2(i+2)+w_2(i+1)+w_2(i))\%2$$

$$i=0,1,2,\ldots,C-1 \qquad \text{[Equation 2]}$$

Here, values of an initial shift register of $w_1(\cdot)$ may be defined as "$w_1(0)=1$, $w_1(k)=0$, $\{k=1, 2, \ldots, 30\}$". Values of an initial shift register of $w_2(\cdot)$ may be defined as "$\Sigma_{k=0}^{15} RNTI_{UE}(k) \cdot 2^k = \Sigma_{k=0}^{k=30} w_2(k) \cdot 2^k$". $RNTI_{ue}$ may be an ID of a terminal (e.g., UE) that is a signal reception target. The size of $RNTI_{UE}$ may be variously set. For example, the size of $RNTI_{UE}$ may be 16 bits. E may be an arbitrary constant. In the scrambling operation, the codeword may not be divided into partial codewords.

The output $d(\cdot)$ of the interleaving means 330 or the scrambling means 300 may be defined as in Equation 3 below.

$$d(i)=d_7(i) \text{ or } d(i)=c(i) \cdot w(i), i=0,1,2,\ldots,C-1 \qquad \text{[Equation 3]}$$

The modulation means 340 may generate a symbol stream $e(\cdot)$ by performing a modulation operation on $d(\cdot)$. The symbol stream $e(\cdot)$ may include one or more modulation symbols. The output $e(\cdot)$ of the modulation means 340 may be a symbol stream for a single layer. The symbol mapping means 350 may perform a space (e.g., antenna port)-frequency mapping operation to transmit the symbol stream $e(\cdot)$ in $N_L$ spaces (e.g., spatial resources). The space-frequency mapping operation may be performed using Equation 4 below. That is, a symbol mapping pattern may be determined based on Equation 4 below.

$$S = \begin{bmatrix} e(i)_{m=0,k=0} & e(i)_{m=0,k=1} & \ldots & e(i)_{m=0,k=K-1} \\ e(i)_{m=1,k=0} & e(i)_{m=1,k=1} & \ldots & e(i)_{m=1,k=K-1} \\ & & \vdots & \\ e(i)_{m=N_t-1,k=0} & e(i)_{m=N_t-1,k=1} & \ldots & e(i)_{m=N_t-1,k=K-1} \end{bmatrix} \quad \text{[Equation 4]}$$

$$m = \frac{N_t}{N_L}(i \% N_L) + \left\lfloor \frac{i}{N_{SSF}} \right\rfloor \% \left( \frac{N_t}{N_L} \right)$$

$$k = \left\lfloor \frac{i}{N_L} \right\rfloor \% K$$

$$i = 0, 1, 2, \ldots, \frac{C}{Q} - 1$$

When the symbol stream $e(\cdot)$ exists in the frequency domain to use an OFDM waveform, a resource element (RE) index k may be an index of the frequency domain (e.g., subcarrier index). When the symbol stream $e(\cdot)$ exists in the time domain to use a single carrier block transmission (SCBT) waveform, the RE index k may be an index in the time domain (e.g., symbol index).

In a matrix S of Equation 4, a row may mean a spatial resource. That is, each of the rows in the matrix S may be mapped to an antenna (e.g., RF chain). m may be an antenna index. In the matrix S of Equation 4, a column may mean a frequency resource or a time resource. When the column of the matrix S means a frequency resource, the maximum value K of the index k in the frequency domain may correspond to a bandwidth. When the column of the matrix S means a time resource, the maximum value K of the index k of the time domain may correspond to an ending time of a slot or subframe.

$N_t$ may be the total number of antennas (e.g., antenna ports). $N_L$ may be the number of spatial layers. For example, $N_L$ may be the number of spatial layers multiplexed in the same frequency resource (e.g., subcarrier) or the same time resource (e.g., symbol). $N_L$ may mean that there are two or more multiplexed spatial layers. $N_{SSF}$ may be the number of symbols belonging to a space-frequency grid or a space-time grid.

In the space-frequency grid, a spatial domain may be all spatial resources, and a frequency domain may be $N_{SSF}/N_L$ frequency resources (e.g., subcarriers). When the frequency domain of the space-frequency grid includes a plurality of frequency resources, a symbol mapping pattern may be the same in each spatial domain of the plurality of frequency resources. For example, a mapping position of symbol(s) in a spatial domain of a frequency resource #1(e.g., position of a spatial resource to which the symbol(s) is mapped) is equal to a mapping position of symbol(s) in a spatial domain of a frequency resource #2.

In the space-time grid, a spatial domain may be all spatial resources, and a time domain may be $N_{SSF}/N_L$ time resources (e.g., symbols). When the time domain of the space-time grid includes a plurality of time resources, a symbol mapping pattern may be the same in each spatial domain of the plurality of time resources. For example, a mapping position of symbol(s) in a spatial domain of a time resource #1(e.g., position of a spatial resource to which the symbol(s) is mapped) is equal to a mapping position of symbol(s) in a spatial domain of a time resource #2.

The symbol mapping means 350 may map the symbol stream $c(\cdot)$ to the space-frequency domain or the space-time domain based on $N_t$, $N_L$, and $N_{SSF}$. The transmitter (e.g., base station) may adjust a transmission quality and/or reception complexity by changing the above-described parameter(s) (e.g., $N_t$, $N_L$, and/or $N_{SSF}$) The relationship between the transmission quality and the reception complexity may be a tradeoff relationship.

Figure 5:
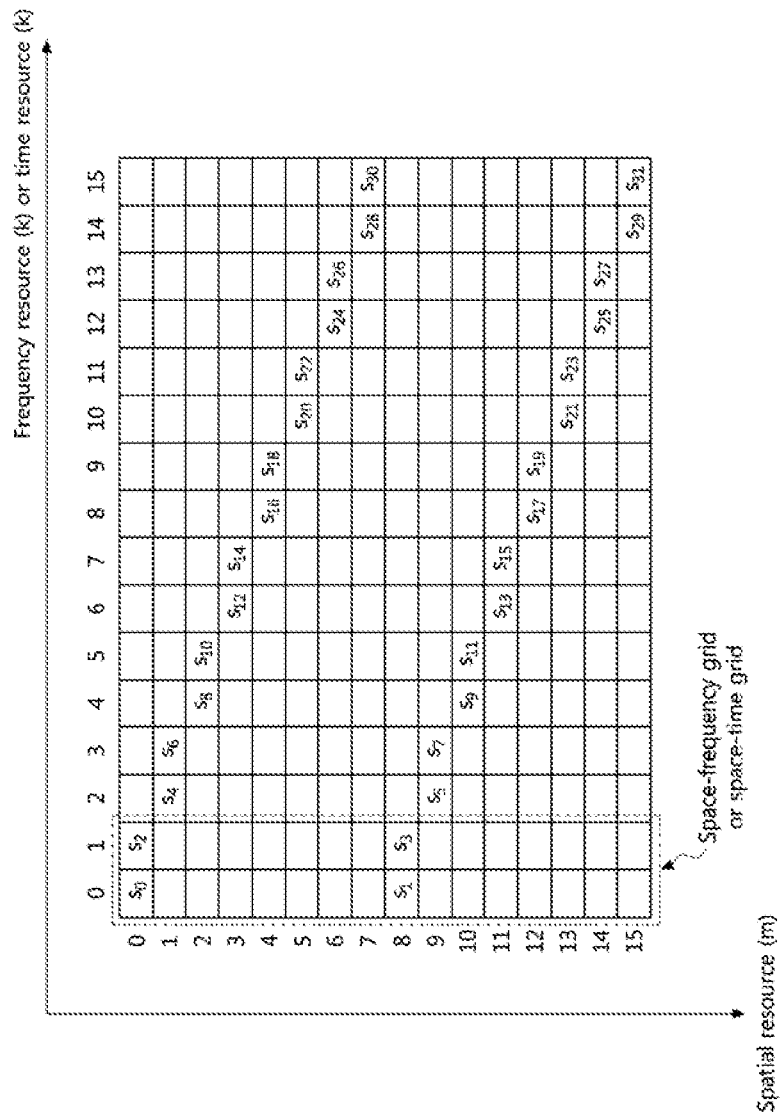
FIG. 5 is a conceptual diagram illustrating a first exemplary embodiment of a symbol mapping method.

FIG. 5 is a conceptual diagram illustrating a first exemplary embodiment of a symbol mapping method.

Referring to FIG. 5, $N_t$ may be 16, $N_L$ may be 2, and $N_{SSF}$ may be 4. The symbol mapping means 350 may map a symbol to a resource (m,k). The symbol (e.g., modulation symbol $c(\cdot)$) may be allocated based on a spatial domain first mapping scheme. For example, when the symbol mapping operation for the spatial domain is completed in the frequency resource #0 or the time resource #0, the symbol mapping operation for the spatial domain may be performed in the frequency resource #1 or the time resource #1. The frequency resource may be a subcarrier, and the time resource may be a symbol.

The symbol mapping means 350 may map the first symbol to the first RE in the space-frequency domain or the space-time domain. For example, the symbol mapping means 350 may map a symbol #0 (i.e., $S_0$) to a resource (0,0). A spatial resource $m(S_1)$ to which a symbol #1 (i.e., $S_1$) is mapped in a resource (e.g., frequency resource or time resource) having k=0 may be determined based on Equation 5 below. Based on Equation 5 below, the symbol #1 (i.e., $S_1$) may be mapped to a resource (8,0).

$$m(s_{i+1}) = m(s_i) + \frac{N_t}{N_L}, i = 0, 1, \ldots \qquad \text{[Equation 5]}$$

Since $N_L$ is 2, when two symbols are mapped in the resource having k=0, the symbol mapping means 350 may perform a symbol mapping operation in a resource having k=1. When $N_t$=16, $N_L$=2, and $N_{SSF}$=4, in the space-frequency grid (or space-time grid), a spatial domain may include 16 spatial resources, and a frequency domain (or, time domain) may include two (=$N_{SSF}/N_L$) frequency resources (or time resources). The symbol mapping pattern may be the same in the same space-frequency grid (or space-time grid). Accordingly, the symbol mapping means 350 may map symbols (e.g., $S_2$, $S_3$) in the spatial domain of the resource having k=1 in the same manner as the symbol mapping pattern in the spatial domain of the resource having k=0. In this case, the symbol #2 (i.e., $S_2$) may be mapped to a resource (0,1), and the symbol #3 (i.e., $S_3$) may be mapped to a resource (8,1).

When two symbols are mapped in the resource having k=1, the symbol mapping means 350 may perform a symbol mapping operation in the resource having k=2. The symbol mapping means 350 may map a symbol #4 (i.e., $S_4$) to a resource (1,2) and map a symbol #5 to a resource (9,2) based on Equation 5. The symbol mapping means 350 may map symbols in the spatial domain of the remaining k resources based on the above-described method. The symbol mapped to the space-frequency domain may include a cyclic prefix (CP). The output of the symbol mapping means 350 may be s(•). s(•) may be wirelessly transmitted through the RF chain 360 and the antenna 370. The output of the antenna 370 (e.g., signal transmitted wirelessly) may be x(•).

Figure 6:
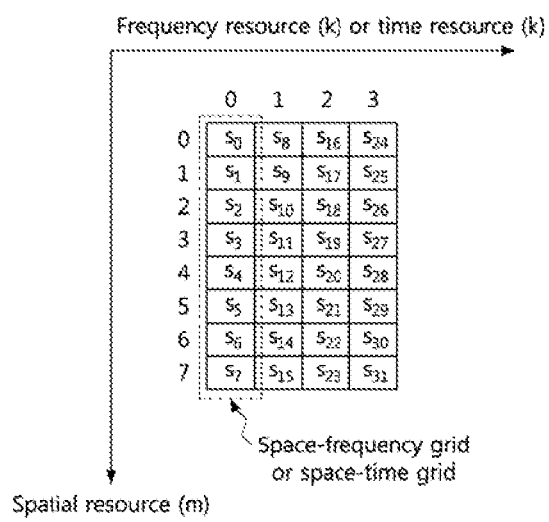
FIG. 6 is a conceptual diagram illustrating a second exemplary embodiment of a symbol mapping method.

FIG. 6 is a conceptual diagram illustrating a second exemplary embodiment of a symbol mapping method.

may include one (=$N_{SSF}/N_L$) frequency resource (or time resource). The symbol mapping pattern may be the same in the same space-frequency grid (or space-time grid). Accordingly, the symbol mapping pattern in the spatial domain of the resource having k=1 may be independent from the symbol mapping pattern in the spatial domain of the resource having k=0.

The symbol mapping unit 350 may map symbols in the spatial domain of the remaining k resources based on the above-described method. The symbol mapped to the space-frequency domain may include a CP. The output of the symbol mapping means 350 may be s(•). s(•) may be wirelessly transmitted through the RF chain 360 and the antenna 370. The output of the antenna 370 (e.g., signal transmitted wirelessly) may be x(•).

Meanwhile, the modulation symbols e(•) may not be mapped to the space-frequency domain or the space-time domain in a normalized form. That is, the modulation symbol e(•) may be mapped to random REs and space (e.g., antenna port). The symbol mapping method may be the same as the rule according to Equation 4. The modulation symbol e(•) actually mapped to the space-frequency domain or the space-time domain may be an interleaved modulation symbol. For example, the modulation symbols e(•) may be interleaved based on Equation 6 below, and the interleaved modulation symbols may be mapped to the space-frequency domain or the space-time domain.

$$S = \begin{bmatrix} e(d_7(i))_{m=0,k=0} & e(d_7(i))_{m=0,k=1} & \cdots & e(d_7(i))_{m=0,k=K-1} \\ e(d_7(i))_{m=1,k=0} & e(d_7(i))_{m=1,k=1} & \cdots & e(d_7(i))_{m=1,k=K-1} \\ & & \vdots & \\ e(d_7(i))_{m=N_t-1,k=0} & e(d_7(i))_{m=N_t-1,k=1} & \cdots & e(d_7(i))_{m=N_t-1,k=1} \end{bmatrix} \quad \text{[Equation 6]}$$

Referring to FIG. 6, $N_t$ may be 8, $N_L$ may be 8, and $N_{SSF}$ may be 8. The symbol mapping means 350 may map a symbol to a resource (m,k). The symbol may be allocated based on a spatial domain first mapping scheme. For example, when the symbol mapping operation for the spatial domain is completed in the frequency resource #0 or the time resource #0, the symbol mapping operation for the spatial domain may be performed in the frequency resource #1 or the time resource #1. The frequency resource may be a subcarrier, and the time resource may be a symbol.

The symbol mapping means 350 may map the first symbol to the first RE in the space-frequency domain or the space-time domain. For example, the symbol mapping means 350 may map a symbol #0 (i.e., $S_0$) to a resource (0,0). A spatial resource (i.e., m($S_1$)) to which a symbol #1 (i.e., $S_1$) is mapped in a resource (e.g., frequency resource or time resource) having k=0 may be determined based on Equation 5 described above. Based on Equation 5 described above, the symbol #1 (i.e., $S_1$) may be mapped to a resource (1,0). In addition, a symbol #2 (i.e., $S_2$) may be mapped to a resource (2,0), a symbol #3 (i.e., $S_3$) may be mapped to a resource (3,0), a symbol #4 (i.e., $S_4$) may be mapped to a resource (4,0), a symbol #5 (i.e., $S_5$) may be mapped to a resource (5,0), a symbol #6 (i.e., $S_6$) may be mapped to a resource (6,0), and a symbol #7 (i.e., $S_7$) may be mapped to a resource (7,0).

Here, since $N_L$ is 8, when 8 symbols are mapped to a resource having k=0, the symbol mapping means 350 may perform a symbol mapping operation in a resource having k=1. When $N_t$=8, $N_L$=8, and $N_{SSF}$=8, in the space-frequency grid (or space-time grid), a spatial domain may include 8 spatial resources, and a frequency domain (or time domain)

A separate length $L_{itlv,t}$ related to $d_7$(•) may be applied. '$a_0$, $a_1$, $a_2$, $a_3$' may be determined based on the terminal ID. Here, '$a_0$, $a_1$, $a_2$, $a_3$' may be different from $a_0$, $a_1$, $a_2$, $a_3$' applied to Equation 1.

Meanwhile, the above-described symbol mapping method may be performed by a transmitter shown in FIG. 7 below.

Figure 7:
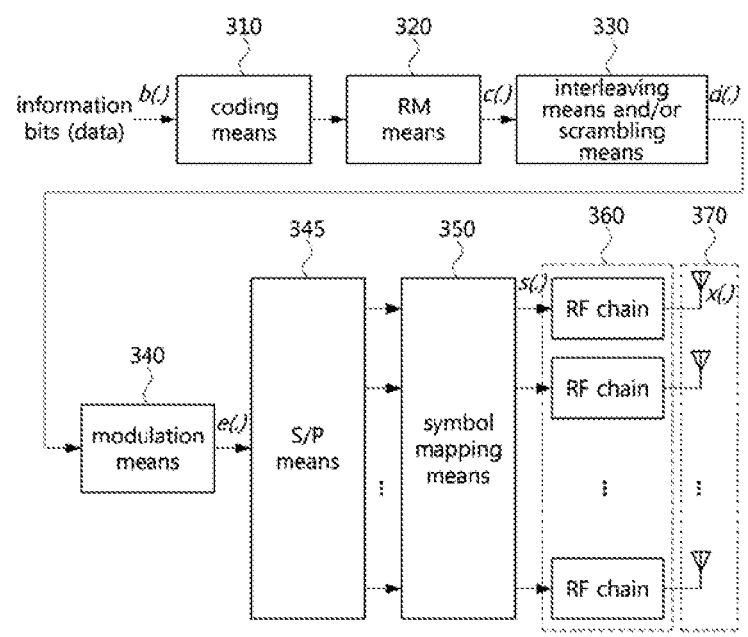
FIG. 7 is a block diagram illustrating a second exemplary embodiment of a transmitter in a communication system.

FIG. 7 is a block diagram illustrating a second exemplary embodiment of a transmitter in a communication system.

Referring to FIG. 7, a transmitter may comprise the coding means 310, the RM means 320, the interleaving means 330 (or scrambling means 330), the modulation means 340, a serial-to-parallel (S/P) means 345, the symbol mapping means 350, the RF chain 360, and the antenna 370. The RM means 320, interleaving means 330, and/or scrambling means 330 may be optional means. Operations of the coding means 310, RM means 320, interleaving means 330 (or scrambling means 330), modulation means 340, S/P means 345, symbol mapping means 350, RF chain 360, and antenna 370 may be controlled by the processor 210 shown in FIG. 2.

That is, the transmitter shown in FIG. 7 may further include the S/P means 345 compared to the transmitter shown in FIG. 3. The input of the S/P means 345 may be connected with the output of the modulation means 340, and the output of the S/P means 345 may be connected with the input of the symbol mapping means 350. The output of the S/P means 345 may be symbols in a form of a parallelized vector, and the corresponding symbols may be input to the symbol mapping means 350. Assuming that the output of the S/P means 345 is e(•), e(•) may be obtained based on Equation 7 below.

$$e(i \cdot J + j) = \begin{bmatrix} \overline{e}_{j=0}(i) \\ \overline{e}_{j=1}(i) \\ \cdots \\ \overline{e}_{j=J-1}(i) \end{bmatrix}$$ [Equation 7]

$$i = 0, 1, 2, \cdots, \frac{C}{Q \cdot J} - 1$$

J may be a size of a column vector, and an element corresponding to an index j may be selected.

In another exemplary embodiment, the symbol mapping method described above may be performed in a transmitter shown in FIG. 8 below.

FIG. 8 is a block diagram illustrating a third exemplary embodiment of a transmitter in a communication system.

Referring to FIG. 8, a transmitter may comprise the coding means 310, the RM means 320, a duplication means 325, the interleaving means 330 (or scrambling means 330), the modulation means 340, the symbol mapping means 350, the RF chain 360, and the antenna 370. The RM means 320, interleaving means 330, and/or scrambling means 330 may be optional means. Operations of the coding means 310, RM means 320, duplication means 325, interleaving means 330 (or scrambling means 330), modulation means 340, RF chain 360, and antenna 370 may be controlled by the processor 210 shown in FIG. 2.

That is, the transmitter shown in FIG. 8 may further include the duplication means 325 compared to the transmitter shown in FIG. 3. The input of the duplication means 325 may be connected with the output of the RM means 320, and the output of the duplication means 325 may be connected with the input of the interleaving means 330 (or scrambling means 330).

The duplication means 325 may receive a single codeword from the RM means 320, and may output a plurality of codewords by duplicating the single codeword. Each of the plurality of codewords may correspond to symbols in form of the parallelized vector that are the output of the S/P means 345 shown in FIG. 7. Each of the plurality of codewords, which is the output of the duplication means 325, may be input to each interleaving means 330 and/or each scrambling means 330. In the interleaving means 330, the plurality of codewords may be interleaved using different interleaving patterns. In the scrambling means 330, the plurality of codewords may be scrambled using different scrambling patterns.

For example, as shown in Equation 8 below, a different interleaving operation and/or a different scrambling operation may be performed according to the index j.

$$d_j = d_7((i+\beta \cdot j)\%L_{itlv}) \text{ or } d_j(i) = c(i) \cdot w(i+\beta \cdot j), i=0,1, 2,\ldots,C-1$$ [Equation 8]

β may be an arbitrary constant. The length of the codeword may be different for each parallel stream j. The modulation order applied to the codeword may also be different for each parallel stream j.

In another exemplary embodiment, the symbol mapping method described above may be performed in a transmitter shown in FIG. 9 below.

FIG. 9 is a block diagram illustrating a fourth exemplary embodiment of a transmitter in a communication system.

Referring to FIG. 9, a transmitter may comprise an S/P means 305, the coding means 310, the RM means 320, the interleaving means 330 (or scrambling means 330), the modulation means 340, the symbol mapping means 350, the RF chain 360, and the antenna 370. The RM means 320, interleaving means 330, and/or scrambling means 330 may be optional means. Operations of the S/P means 305, coding means 310, RM means 320, interleaving means 330 (or scrambling means 330), modulation means 340, RF chain 360, and antenna 370 may be controlled by the processor 210 shown in FIG. 2.

That is, the transmitter shown in FIG. 9 may further include the S/P means 305 compared to the transmitter shown in FIG. 3. Data may be input to the S/P means 305. The S/P means 305 may output a plurality of information bit streams b(•), and each of the plurality of information bit streams b(•) may be input to each coding means 310. The plurality of information bit streams may be composed of the same information bits. That is, the plurality of information bit streams may be generated based on the same data. Alternatively, the plurality of information bit streams may be composed of different information bits. That is, the plurality of information bit streams may be generated based on different data. The length of the codeword may be different for each parallel stream j. The modulation order applied to the codeword may also be different for each parallel stream j.

2) Time Domain Filter Convolution-Based Precoding Method

To obtain a frequency diversity gain or a time diversity gain as well as a transmission diversity gain through a spatial domain, a convolution pre-filter for each antenna may be applied in the time domain. h, which is an average impulse response column vector based on a power delay profile (PDP) of a current radio channel, may be expressed as Equation 9 below.

$$h = \begin{bmatrix} h_0 \\ h_1 \\ \vdots \\ h_{D-1} \end{bmatrix}$$ [Equation 9]

D may be a value of a maximum delay spread in a current radio channel h. That is, a signal x(•) output through an antenna m may be transmitted through a frequency selective multi-path fading channel. The frequency selective multi-path fading channel may be represented by H. H may be in a form of a Toeplitz matrix of h. The receiver may receive the signal from the transmitter, and the signal received at the receiver may be expressed as y. y may be defined as in Equation 10 below, and may be a vector signal.

$$y = Hx = \begin{bmatrix} h_0 & 0 & 0 & \cdots & 0 \\ h_1 & h_0 & 0 & \ddots & 0 \\ h_2 & h_1 & h_0 & \ddots & \vdots \\ \vdots & \vdots & \vdots & \ddots & 0 \\ h_{D-1} & h_{D-2} & h_{D-3} & \ddots & h_0 \\ 0 & h_{D-1} & h_{D-2} & \ddots & h_1 \\ 0 & 0 & h_{D-1} & \ddots & h_2 \\ \vdots & \vdots & \vdots & \ddots & \vdots \\ 0 & 0 & 0 & \cdots & h_{D-1} \end{bmatrix} \begin{bmatrix} x_0 \\ x_1 \\ x_2 \\ \vdots \\ x_{D-1} \end{bmatrix}$$ [Equation 10]

H may be a matrix composed of 2D−1 rows and D columns. When a vector having a desired channel impulse response is denoted by $\tilde{h}$, a precoding vector p may be defined as in Equation 11 below.

$$p = H^{-1}\tilde{h}$$ [Equation 11]

$H^{-1}$ may be a pseudo inverse matrix of H. A transmission signal that undergoes the effective channel $\tilde{h}$ may be received at the receiver. A signal $\tilde{y}$ received at the receiver may be defined as in Equation 12 below.

$$\tilde{y} = \tilde{H}(Px) = \begin{bmatrix} h_0 & 0 & 0 & \cdots & 0 \\ h_1 & h_0 & 0 & \ddots & 0 \\ h_2 & h_1 & h_0 & \ddots & \vdots \\ \vdots & \vdots & \vdots & \ddots & 0 \\ h_{D+F-1} & h_{D+F-2} & h_{D+F-3} & \ddots & h_0 \\ 0 & h_{D+F-1} & h_{D+F-2} & \ddots & h_1 \\ 0 & 0 & h_{D+F-1} & \ddots & h_2 \\ \vdots & \vdots & \vdots & \ddots & \vdots \\ 0 & 0 & 0 & \cdots & h_{D+F-1} \end{bmatrix}$$ [Equation 12]

$$\left( \begin{bmatrix} p_0 & 0 & 0 & \cdots & 0 \\ p_1 & p_0 & 0 & \ddots & 0 \\ p_2 & p_1 & p_0 & \ddots & \vdots \\ \vdots & \vdots & \vdots & \ddots & 0 \\ p_{F-1} & p_{F-2} & p_{F-3} & \ddots & p_0 \\ 0 & p_{F-1} & p_{F-2} & \ddots & p_1 \\ 0 & 0 & p_{F-1} & \ddots & p_2 \\ \vdots & \vdots & \vdots & \ddots & \vdots \\ 0 & 0 & 0 & \cdots & p_{F-1} \end{bmatrix} \begin{bmatrix} x_0 \\ x_1 \\ x_2 \\ \vdots \\ x_{D-1} \end{bmatrix} \right)$$

F may be a length of a precoding convolution vector. The size of H may be adjusted for matrix operations. H with the adjusted size may be expressed as $\hat{H}$. A value from $h_D$ to $h_{D+F-1}$, which is a channel impulse response, may be 0. The precoding convolution vector p may be transformed into the frequency domain before a modulation operation. The transformed precoding convolution vector p may be multiplied by an antenna-specific symbol stream $s_m(\cdot)$, instead of convolution. The symbol stream $s_m(\cdot)$ may be a row of the matrix S in Equation 4 above.

Communication based on the above-described methods may be performed as follows.

FIG. 10 is a sequence chart illustrating a first exemplary embodiment of a communication method using multiple antennas in a communication system.

Referring to FIG. 10, a communication system may include a first communication node and a second communication node. The first communication node may be the base station 110-1, 110-2, 110-3, 120-1, or 120-2 shown in FIG. 1, and the second communication node may be the terminal 130-1, 130-2, 130-3, 130-4, 130-5, of 130-6 shown in FIG. 1. Alternatively, the first communication node may be a terminal, and the second communication node may be a base station. Alternatively, the first communication node and the second communication node may be different terminals. The first communication node and the second communication node may be configured to be the same as or similar to the communication node 200 shown in FIG. 2.

The first communication node may be a transmitter that transmits a signal, and the second communication node may be a receiver that receives the signal. The first communication node may be the transmitter shown in FIG. 3, 7, 8, or 9. Each of the first communication node and the second communication node may include a plurality of antennas. The number $N_t$ of transmission antennas of the first communication node may be greater than the number $N_r$ of reception antennas of the second communication node.

The first communication node may set parameter(s) for multi-antenna transmission (S1001). The parameter(s) may include $N_L$, $N_f$, $N_{SSF}$, and the like. $N_L$, $N_f$, and/or $N_{SSF}$ may be used to determine a symbol mapping pattern in a resource domain. The resource domain may be a space-frequency domain or a space-time domain. Transmission quality and/or reception complexity may be adjusted according to the value(s) of the above-described parameter(s) (e.g., $N_L$, $N_f$, and/or $N_{SSF}$) Accordingly, the first communication node may set $N_L$, $N_f$, and/or $N_{SSF}$ in consideration of the transmission quality (e.g., transmission reliability) and/or reception complexity.

The first communication node may transmit one or more of the parameters set in the step S1001 to the second communication node (S1002). For example, the parameter(s) may be transmitted using one or a combination of one or more among a higher layer message (e.g., system information, radio resource control (RRC) message), a medium access control (MAC) layer message (e.g., MAC control element (CE)), and a physical (PHY) layer message (e.g., downlink control information (DCI)). The second communication node may receive the parameter(s) (e.g., $N_L$, $N_f$, and/or $N_{SSF}$) from the first communication node.

Data (e.g., information bits) to be transmitted to the second communication node may be generated in the first communication node. In this case, the first communication node may generate symbols for the information bits (S1003). In the exemplary embodiments shown in FIGS. 3, 7, 8, and 9, the information bits may be b(•), and the symbol may be e(•) or $\bar{e}(\cdot)$. The first communication node may generate the symbols (e(•) or $\bar{e}(\cdot)$) for the information bits b(•) by performing a coding operation, a rate matching operation, an interleaving operation (or scrambling operation), and/or a modulation operation.

The first communication node may map the symbols (e(•) or $\bar{e}(\cdot)$) to a space-frequency domain or a time domain (S1004). The step S1004 may be performed based on the parameter(s) set in the step S1001 (e.g., $N_L$, $N_f$, and/or $N_{SSF}$). The first communication node may perform a symbol mapping operation based on Equation 4 described above.

When $N_L=2$, $N_f=16$, and $N_{SSF}=4$, the first communication node may map the symbols to a space-frequency domain or a space-time domain as in the exemplary embodiment shown in FIG. 5. When $N_L=8$, $N_f=8$, and $N_{SSF}=8$, the first communication node may map the symbols to a space-frequency domain or a space-time domain as in the exemplary embodiment shown in FIG. 6. When the step S1004 is completed, the first communication node may transmit a signal to the second communication node through an RF chain and an antenna (S1005).

The second communication node may receive the signal from the first communication node. When the signal transmitted from the first communication node is x, a signal received at the second communication node may be y defined in Equation 10 or $\tilde{y}$ defined in Equation 12. The second communication node may identify a symbol mapping pattern in the space-frequency domain or the space-time domain based on the parameter(s) (e.g., $N_L$, $N_f$, and/or $N_{SSF}$) received in the step S1001. The second communication node may obtain symbols from the signal based on the identified symbol mapping pattern, and obtain the data (e.g., information bits) by performing a demodulation operation, a deinterleaving operation (or descrambling operation), a rate matching operation, and/or a decoding operation on the symbols.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first communication node in a communication system, the operation method comprising:
generating a plurality of modulation symbols for information bits;
determining a symbol mapping pattern based on a number $N_t$ of antennas of the first communication node, a number $N_L$ of spatial layers multiplexed in a same frequency resource, and a number $N_{SSF}$ of modulation symbols belonging to one space-frequency grid;
mapping the plurality of modulation symbols to a space-frequency domain based on the symbol mapping pattern; and
transmitting the plurality of modulation symbols mapped to the space-frequency domain to a second communication node using the antennas,
wherein the mapping of the plurality of modulation symbols to the space-frequency domain comprises:
mapping a modulation symbol #i among the plurality of modulation symbols to a spatial resource #m in a frequency resource #k; and
mapping a modulation symbol #i+1 among the plurality of modulation symbols to a spatial resource #m+$N_t/N_L$ of the frequency resource #k,
wherein each of i, k, and m is an integer equal to or greater than 0, and $N_t/N_L$ is an integer equal to or greater than 2.

2. The operation method according to claim 1, wherein the plurality of modulation symbols are symbols in a vector form, which are converted by serial-to-parallel conversion.

3. The operation method according to claim 1, wherein the generating of the plurality of modulation symbols comprises:
generating one codeword for the information bits;
generating a plurality of codewords by duplicating the one codeword;
performing an interleaving operation or a scrambling operation for each of the plurality of codewords; and
generating the plurality of modulation symbols by performing a modulation operation on each of the interleaved codewords or the scrambled codewords.

4. The operation method according to claim 1, wherein the generating of the plurality of modulation symbols comprises:
generating a plurality of information bit streams by performing serial-to-parallel conversion on the information bits;
generating a plurality of codewords by performing a coding operation on each of the plurality of information bit streams;
performing an interleaving operation or a scrambling operation for each of the plurality of codewords; and
generating the plurality of modulation symbols by performing a modulation operation on each of the interleaved codewords or the scrambled codewords.

5. The operation method according to claim 1, wherein one or more space-frequency grids exist in the space-frequency domain, a number of spatial resources in the one space-frequency grid is $N_t$, a number of frequency resources in the one space-frequency grid is $N_{SSF}/N_L$, and a symbol mapping pattern is same in the $N_{SSF}/N_L$ frequency resources of the one space-frequency grid.

6. The operation method according to claim 1, further comprising transmitting, to the second communication node, a message including one or more of $N_t$, $N_L$, and $N_{SSF}$.

7. An operation method of a second communication node in a communication system, the operation method comprising:
receiving, from a first communication node, a message including information on a number $N_t$ of antennas of the first communication node, a number $N_L$ of spatial layers multiplexed in a same frequency resource, and a number $N_{SSF}$ of modulation symbols belonging to one space-frequency grid;
receiving a signal including data from the first communication node;
obtaining a plurality of symbols from the signal based on a symbol mapping pattern determined based on $N_t$, $N_L$, and $N_{SSF}$; and
obtaining the data by performing demodulation and decoding operations on the plurality of symbols,
wherein the obtaining of the plurality of symbols comprises:
obtaining a symbol #i among the plurality of symbols from a spatial resource #m of a frequency resource #k; and
obtaining a symbol #i+1 among the plurality of symbols from a spatial resource #m+$N_t/N_L$ of the frequency resource #k,
wherein each of i, k, and m is an integer equal to or greater than 0 and $N_t/N_L$ is an integer equal to or greater than 2.

8. A first communication node in a communication system, the first communication node comprising:
a processor;
a memory electronically communicating with the processor; and
instructions stored in the memory,
wherein when executed by the processor, the instructions cause the first communication node to:
generate a plurality of modulation symbols for information bits;
determine a symbol mapping pattern based on a number $N_t$ of antennas of the first communication node, a number $N_L$ of spatial layers multiplexed in a same frequency resource, and a number $N_{SSF}$ of modulation symbols belonging to one space-frequency grid;
map the plurality of modulation symbols to a space-frequency domain based on the symbol mapping pattern; and
transmit the plurality of modulation symbols mapped to the space-frequency domain to a second communication node using the antennas, wherein the mapping of the plurality of modulation symbols to the space-frequency domain comprises:

mapping a modulation symbol #i among the plurality of modulation symbols to a spatial resource #m in a frequency resource #k; and mapping a modulation symbol #i+1 among the plurality of modulation symbols to a spatial resource #m+$N_t/N_L$ of the frequency resource #k, wherein each of i, k, and m is an integer equal to or greater than 0, and $N_t/N_L$ is an integer equal to or greater than 2.

9. The first communication node according to claim 8, wherein the plurality of modulation symbols are symbols in a vector form, which are converted by serial-to-parallel conversion.

10. The first communication node according to claim 8, wherein when generating the plurality of modulation symbols, the instructions cause the first communication node to:

generate one codeword for the information bits;

generate a plurality of codewords by duplicating the one codeword;

perform an interleaving operation or a scrambling operation for each of the plurality of codewords; and generate the plurality of modulation symbols by performing a modulation operation on each of the interleaved codewords or the scrambled codewords.

11. The first communication node according to claim 8, wherein when generating the plurality of modulation symbols, the instructions cause the first communication node to:

generate a plurality of information bit streams by performing serial-to-parallel conversion on the information bits;

generate a plurality of codewords by performing a coding operation on each of the plurality of information bit streams;

perform an interleaving operation or a scrambling operation for each of the plurality of codewords; and generate the plurality of modulation symbols by performing a modulation operation on each of the interleaved codewords or the scrambled codewords.

12. The first communication node according to claim 8, wherein one or more space-frequency grids exist in the space-frequency domain, a number of spatial resources in the one space-frequency grid is $N_t$, a number of frequency resources in the one space-frequency grid is $N_{SSF}/N_L$, and a symbol mapping pattern is same in the $N_{SSF}/N_L$ frequency resources of the one space-frequency grid.

* * * * *